United States Patent
Lee et al.

(10) Patent No.: US 11,581,834 B2
(45) Date of Patent: Feb. 14, 2023

(54) METHOD FOR CALCULATING MOTOR ANGLE

(71) Applicants: Hyundai Motor Company, Seoul (KR); Kia Corporation, Seoul (KR); POSTECH Research and Business Development Foundation, Pohang-si (KR)

(72) Inventors: Hee Kwang Lee, Suwon-Si (KR); Hyun Seok Hong, Seoul (KR); Kwang Hee Nam, Pohang-Si (KR); Tae Yeon Lee, Pohang-Si (KR)

(73) Assignees: Hyundai Motor Company, Seoul (KR); Kia Corporation, Seoul (KR); POSTECH Research and Business Development Foundation, Pohang-si (KR)

( * ) Notice: Subject to any disclaimer, the term of this patent is extended or adjusted under 35 U.S.C. 154(b) by 0 days.

(21) Appl. No.: 17/411,921

(22) Filed: Aug. 25, 2021

(65) Prior Publication Data
US 2022/0123675 A1 Apr. 21, 2022

(30) Foreign Application Priority Data
Oct. 20, 2020 (KR) .......... 10-2020-0136242

(51) Int. Cl.
*H02P 21/00* (2016.01)
*H02P 21/22* (2016.01)
*H02P 21/18* (2016.01)

(52) U.S. Cl.
CPC .......... *H02P 21/0017* (2013.01); *H02P 21/18* (2016.02); *H02P 21/22* (2016.02)

(58) Field of Classification Search
CPC ...... H02P 21/0017; H02P 21/18; H02P 21/22; H02P 6/16; H02P 6/18; H02P 21/24
See application file for complete search history.

(56) References Cited

U.S. PATENT DOCUMENTS

| 6,841,969 B1 * | 1/2005 | Schulz | H02P 21/24 |
| | | | 318/807 |
| 2004/0145334 A1 * | 7/2004 | Virtanen | H02P 21/18 |
| | | | 318/712 |

FOREIGN PATENT DOCUMENTS

KR 10-1470025 12/2014

OTHER PUBLICATIONS

Taeyeon Lee, Position Fault Detection and Failover Method for UAM PMSM control, 2021, IEEE, 1627-1633 (Year: 2021).*
Jean Quirion, Sensor-less Fusion of Speed for Permanent Magnet Synchronous Motors, 2004, IEEE, 554-559 (Year: 2004).*

* cited by examiner

*Primary Examiner* — Bickey Dhakal
(74) *Attorney, Agent, or Firm* — Morgan, Lewis & Bockius LLP

(57) ABSTRACT

A method for determining a motor angle, may include deriving a sensor weight and a sensorless weight via a cross product of an actual current vector and a model-based sensored current vector and a cross product of the actual current vector and a model-based sensorless current vector; and determining a final motor angle by applying the sensor weight and the sensorless weight to each of a sensored angle and a sensorless angle.

9 Claims, 4 Drawing Sheets

METHOD FOR CALCULATING MOTOR ANGLE

CROSS REFERENCE TO RELATED APPLICATION

The present application claims priority to Korean Patent Application No. 10-2020-0136242, filed Oct. 20, 2020, the entire contents of which is incorporated herein for all purposes by this reference.

BACKGROUND OF THE INVENTION

Field of the Invention

The present invention relates to an angle sensor fusion method of a high power motor which is used in an Urban Air Mobility (UAM). More particularly, the present invention relates to a method for determining a motor angle, the method being configured to enable an efficient transition to accurate angle information even in a fault situation, and to perform a failover function which is an alternative operation when a fault occurs in any one or more sensors.

Description of Related Art

Conventionally, a method for determining a motor angle necessarily requires three or more angle sensors, determines the order of priority via voting, and is driven by one angle. However, if an abnormality occurs to a high priority angle sensor, a hard transition to a next high priority angle sensor is performed, raising a problem of an unstable failover function. Absolute values of angle errors of three sensors a, b, and c are obtained, and high priority is provided to the angle information with the smallest error, conventionally. The present method is performed by determining averages of angle errors which include the angle information a, b, and c, respectively, and by operating the sensor b which has the smallest error. However, the method raises a problem of the unstable failover function.

Another method is a technique that fuses angles that are obtained via a low-cost sensor and via a sensorless technique that utilizes a back electromotive force. In the present method, a Kalman filter is used to adjust a weight and outputs new angle information. However, the present method also has problems that the selection of an average value is vague, and since the method is based on statistical data, the time to store data to output the average value takes a long time.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an angle sensor fusion method of a high power motor which is used in an Urban Air Mobility (UAM). The present invention is directed to providing a method for determining a motor angle, the method being configured to enable an efficient transition to accurate angle information even in a fault situation, and to perform a failover function which is an alternative operation when a fault occurs in any one or more sensors.

In various aspects of the present invention, there is provided a method for determining a motor angle, the method including: deriving a model-based sensored current vector via a sensored voltage model; deriving a model-based sensorless current vector via a sensorless voltage model; deriving a sensor weight and a sensorless weight via a cross product of an actual current vector and the model-based sensored current vector and a cross product of the actual current vector and the model-based sensorless current vector; and determining a final motor angle by applying the sensor weight and the sensorless weight to each of a sensored angle and a sensorless angle.

The sensored voltage model may receive a stationary axis voltage command vector of a motor, the sensored angle, and a sensored angular velocity as inputs of the sensored voltage model, and may output the model-based sensored current vector.

The sensorless voltage model may receive the stationary axis voltage command vector of the motor, an estimated sensorless angle, and an estimated sensorless angular velocity as inputs of the sensorless voltage model, and may output the model-based sensorless current vector.

The sensored voltage model and the sensorless voltage model may include an ordinary differential equation and an integrator.

In the deriving a sensor weight and a sensorless weight, a sensored error may be determined by squaring the cross product of the actual current vector and the model-based sensored current vector, and a sensorless error may be determined by squaring the cross product of the actual current vector and the model-based sensorless current vector.

In the deriving a sensor weight and a sensorless weight, the sensor weight and the sensorless weight are determined by normalizing each of the sensored error and the sensorless error.

In the determining a final motor angle, the final motor angle may be determined by multiplying the sensored angle by the sensor weight, by multiplying the sensorless angle by the sensorless weight, and then by summing a multiplication result of the sensored angle and the sensor weight and a multiplication result of the sensorless angle and the sensorless weight.

As descried above, various aspects of the present invention are directed to providing a method for determining a motor angle, various aspects of the present invention are directed to providing an angle sensor fusion method of a high power motor which is used in an Urban Air Mobility (UAM). The method for determining a motor angle of the present invention is configured to enable an efficient transition to accurate angle information even in a fault situation, and to perform a failover function which is an alternative operation when a fault occurs in any one or more sensors.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
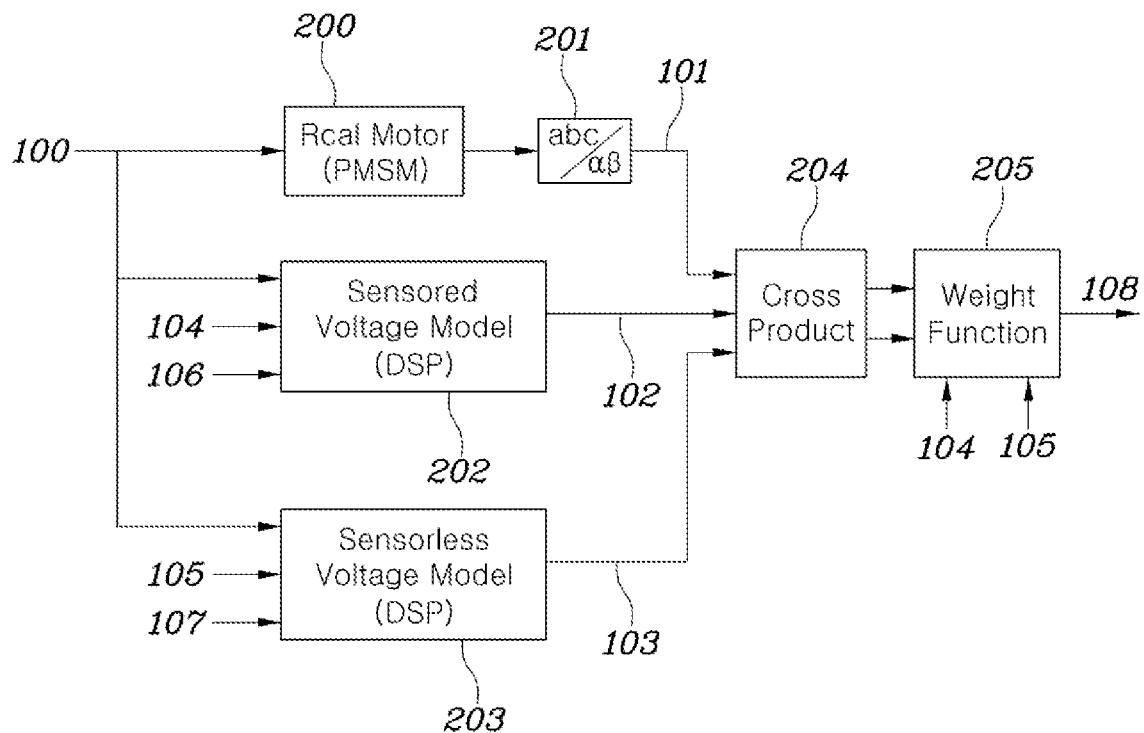
FIG. 1 is a block diagram illustrating a method for determining a motor angle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
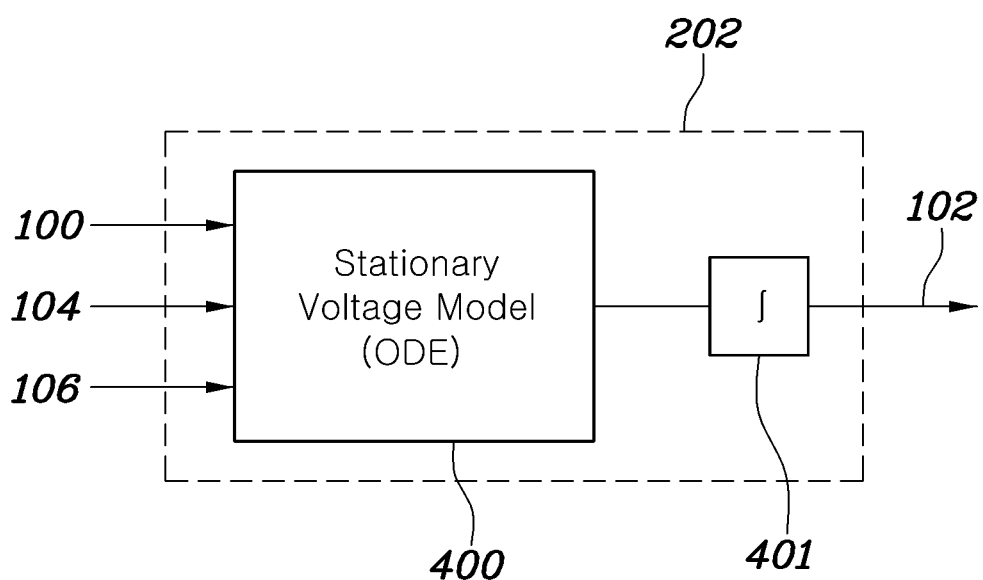
FIG. 2 and FIG. 3 are views each illustrating a sensored voltage model and a sensorless voltage model of the method for determining a motor angle according to various exemplary embodiments of the present invention.
Figure 3:
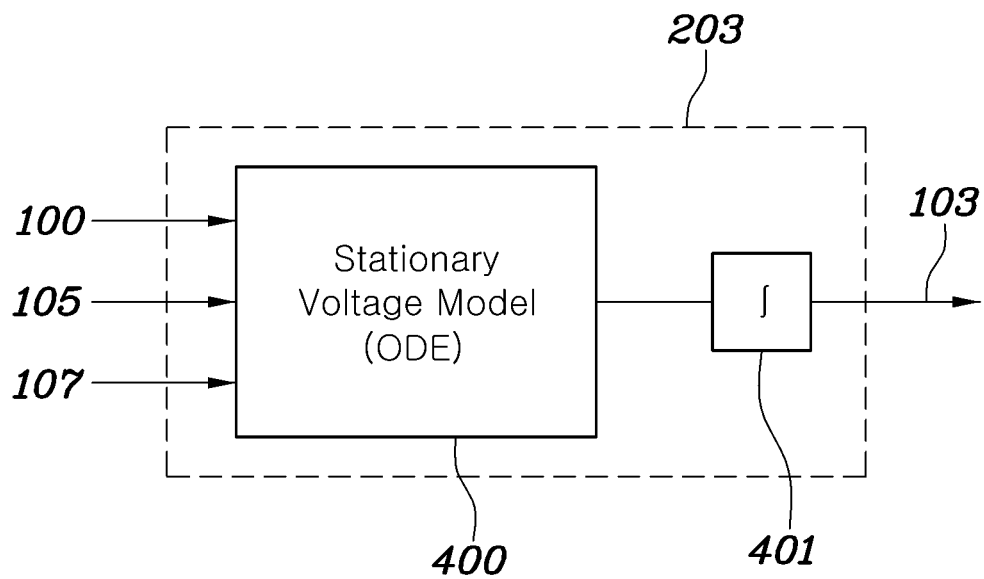
Figure 4:
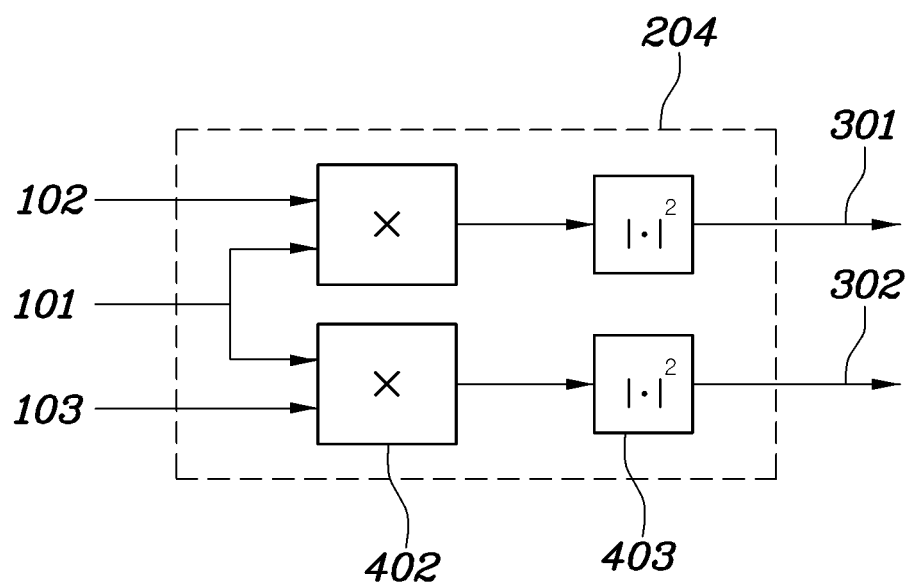
FIG. 4 is a block diagram illustrating a current vector-based cross product block of the method for determining a motor angle according to various exemplary embodiments of the present invention.
Figure 5:
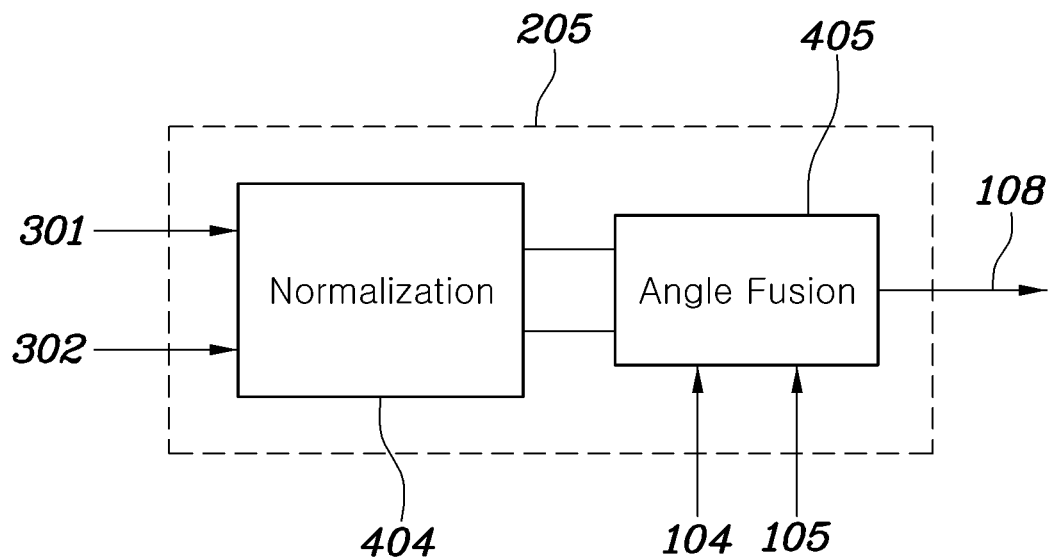
FIG. 5 is a block diagram illustrating an angle fusion block of the method for determining a motor angle according to various exemplary embodiments of the present invention.
Figure 6:
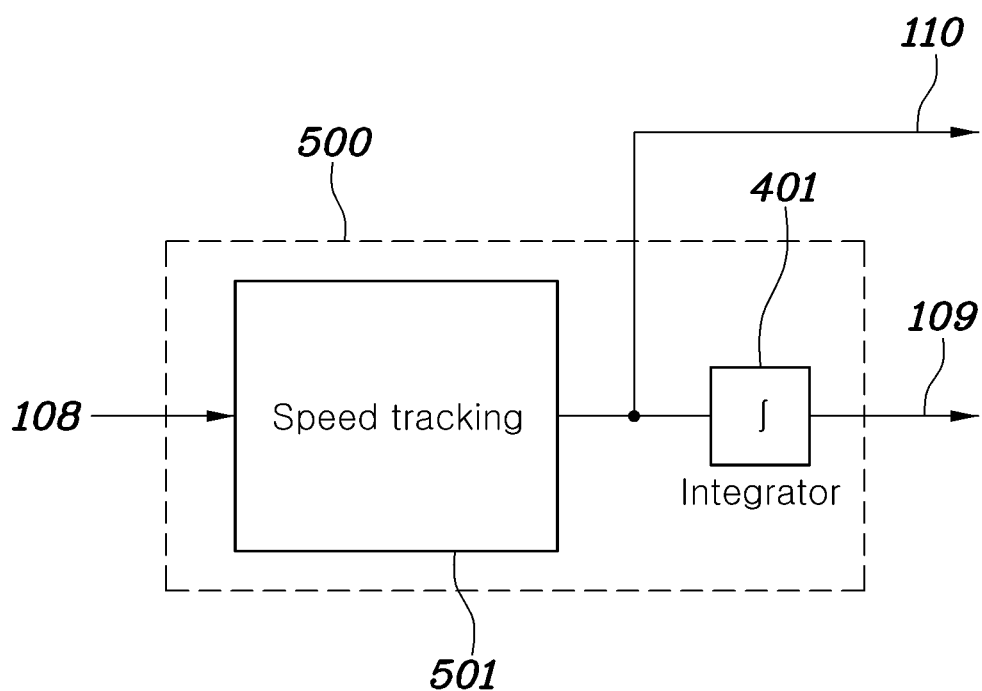
FIG. 6 is a view exemplarily illustrating an estimator that outputs velocity information related to a fused angle of the method for determining a motor angle according to various exemplary embodiments of the present invention.
Figure 7:
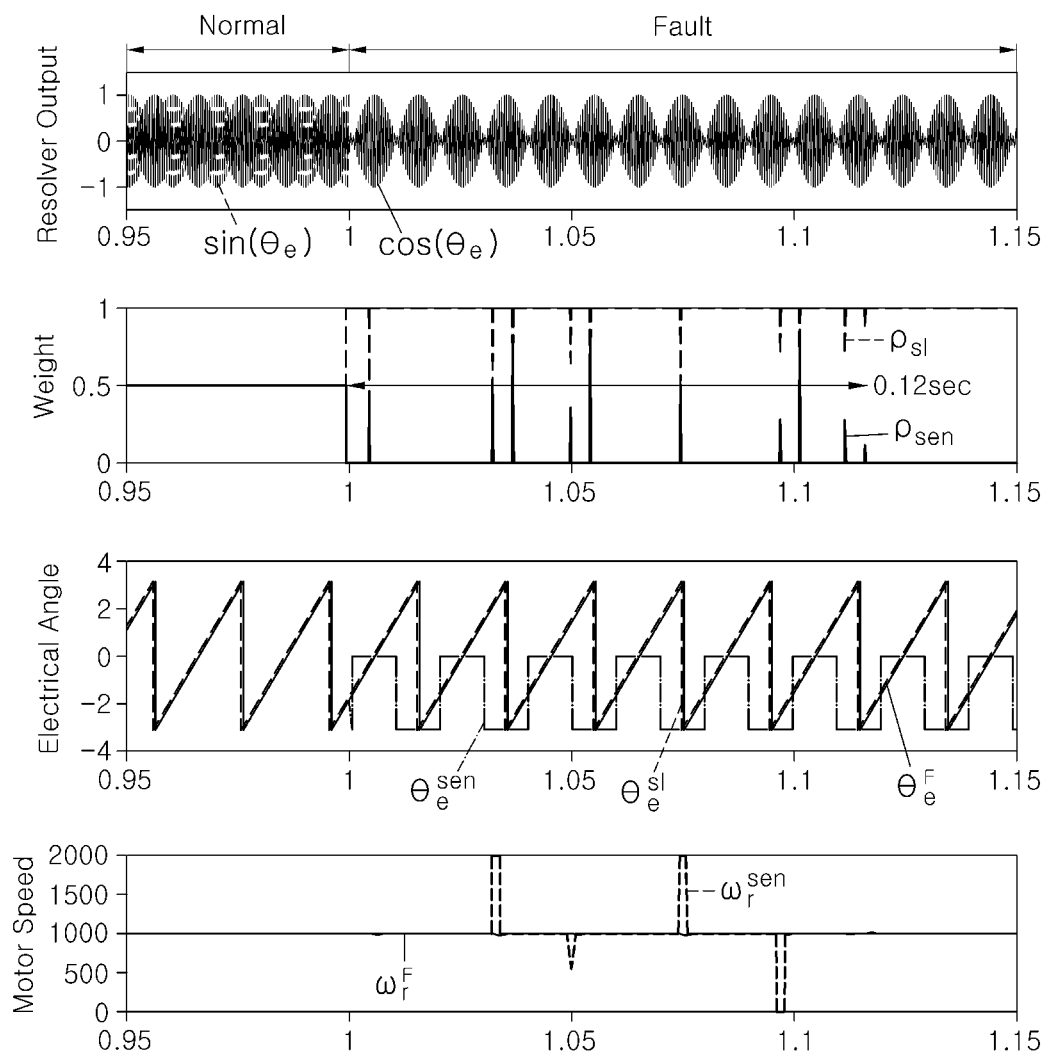
FIG. 7 is a view exemplarily illustrating a simulation result when a fault occurs at an output of a sensor at the moment of one second.

FIG. 1 is a block diagram illustrating a method for determining a motor angle according to various exemplary embodiments of the present invention, FIG. 2 and FIG. 3 are views each illustrating a sensed voltage model and a sensorless voltage model of the method for determining a motor angle according to various exemplary embodiments of the present invention, FIG. 4 is a block diagram illustrating a current vector-based cross product block of the method for determining a motor angle according to various exemplary embodiments of the present invention, FIG. 5 is a block diagram illustrating an angle fusion block of the method for determining a motor angle according to various exemplary embodiments of the present invention, FIG. 6 is a view exemplarily illustrating an estimator that outputs velocity information related to a fused angle of the method for determining a motor angle according to various exemplary embodiments of the present invention, and FIG. 7 is a view exemplarily illustrating a simulation result when a fault occurs at an output of a sensor at the moment of one second.

The method for determining a motor angle according to various exemplary embodiments of the present invention may include deriving a model-based sensed current vector via a sensed voltage model; deriving a model-based sensorless current vector via a sensorless voltage model; deriving a sensor weight and a sensorless weight via a cross product of an actual current vector and the model-based sensed current vector and a cross product of the actual current vector and the model-based sensorless current vector; and determining a final motor angle by applying the sensor weight and the sensorless weight to each of a sensored angle and a sensorless angle.

FIG. 1 is a block diagram of the method for determining a motor angle according to various exemplary embodiments of the present invention. A stationary axis voltage command vector 100 of a motor is commonly applied to an actual Permanent Magnet Synchronous Motor (PMSM) 200, a sensed voltage model 202 written within a digital signal processor (DSP), and a sensorless voltage model 203 written within a processor. A sensed angle 104 and a sensed angular velocity 106, which are detected by a sensor, are input to the sensed voltage model 202. An estimated sensorless angle 105 and an estimated sensorless angular velocity 107, which are estimated by a sensorless control, are input to the sensorless voltage model 203.

A three-phase current ($i_{abc}$) detected at the actual motor 200 is passed through a coordinate converter 201 that converts a coordinate to a stationary axis, and an actual current vector 101 of a stationary axis is obtained. From the sensed voltage model 202 and the sensorless voltage model 203, a model-based sensed current vector 102 and a model-based sensorless current vector 103 are estimated. If the sensed angle 104 or the sensorless angle 105 coincides with the angle of the actual motor rotor, a cross product of the current vectors becomes zero. By use of the present fact, in a current vector-based cross product block diagram 204, a cross product of the actual current vector 101 and the sensed current vector 102 is determined, and in the same manner, a cross product of the actual current vector 101 and the sensorless current vector 103 is determined.

The determined cross product values are squared and enter a weight-based sensor fusion block 205, and are normalized. After the normalization, a sensor weight ($\rho_{sen}$) which decreases as a sensor error increases, and a sensorless weight ($\rho_{sl}$) which decreases as a sensorless error increases, are generated. Based on these weights, fused angle information 108 is output.

First, meanings of important variables that will be used in later description are as follows:

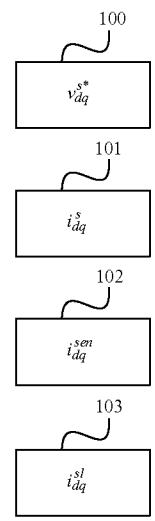

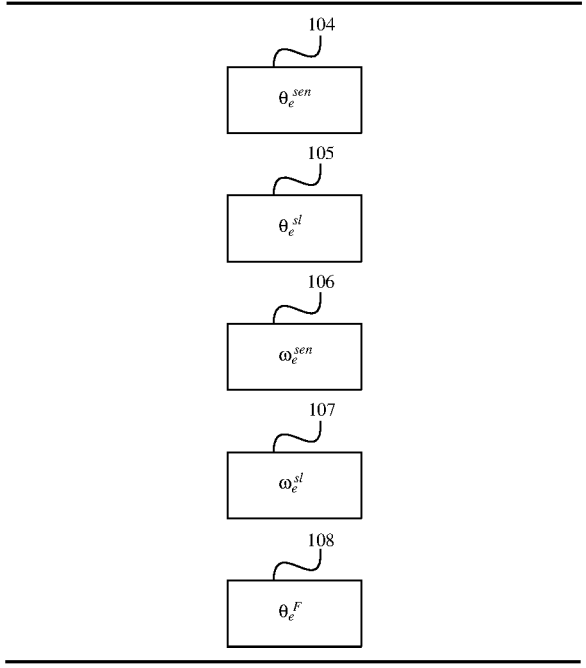

$v^{s*}_{dq}$: stationary axis voltage command vector
$i^s_{dq}$: actual current vector
$i^{sen}_{dq}$: model-based sensored current vector
$i^{sl}_{dq}$: model-based sensorless current vector
$\theta^{sen}_e$: sensored angle
$\theta^{sl}_e$: sensorless angle
$\omega^{sen}_e$: sensored angular velocity
$\omega^{sl}_e$: sensorless electric angular velocity
$\theta^F_e$: fused angle In various exemplary embodiments of the present invention, deriving a model-based sensored current vector via a sensored voltage model, and deriving a model-based sensorless current vector via a sensorless voltage model are performed at first. Each of the sensored voltage model and the sensorless voltage model may include an ordinary differential equation and an integrator. Furthermore, the sensored voltage model may receive a stationary axis voltage command vector of a motor, a sensored angle, and a sensored angular velocity as inputs, and may output the model-based sensored current vector. The sensorless voltage model may receive the stationary axis voltage command vector of a motor, an estimated sensorless angle, and an estimated sensorless angular velocity as inputs, and may output the model-based sensorless current vector.

FIG. 2 and FIG. 3 are views each illustrating the sensored voltage model and the sensorless voltage model of the method for determining a motor angle according to various exemplary embodiments of the present invention. Referring to FIG. 2, the sensored motor stationary axis voltage model 202 receives the stationary axis voltage command vector 100, the sensored angle 104, and the sensored angular velocity 106 as inputs, and outputs the model-based sensored current vector 102.

The interior of the sensored motor stationary axis voltage model 202 includes an ordinary differential equation 400 of the stationary axis voltage model and an integrator 401. The ordinary differential equation 400 of the stationary axis voltage model necessarily includes a stator resistance ($r_s$), a d-axis inductance ($L_d$), q-axis inductance ($L_q$), a sum of inductance ($L_\Sigma$), a difference of inductance ($L_\Delta$), an electric angle ($\theta_e$), a d-axis voltage ($v^s_d v_d$), a q-axis voltage ($v_q v^s_q$), a d-axis current ($i^s_d i_d$), a q-axis current $d(i^s_q i_q)$ and a back electromotive force constant ($\omega_m$), and is expressed by the following equation.

$$\frac{d}{dt}\begin{bmatrix} i^s_d \\ i^s_q \end{bmatrix} = \frac{1}{L_d L_q}\begin{bmatrix} L_\Sigma - L_\Delta\cos(2\theta_e) & -L_\Delta\cos(2\theta_e) \\ -L_\Delta\cos(2\theta_e) & L_\Sigma + L_\Delta\cos(2\theta_e) \end{bmatrix}$$

$$\left(\begin{bmatrix} v^s_d \\ v^s_q \end{bmatrix} - r_s\begin{bmatrix} i^s_d \\ i^s_q \end{bmatrix} - 2\omega_e L_\Delta\begin{bmatrix} -\sin(2\theta_e) & \cos(2\theta_e) \\ \cos(2\theta_e) & \sin(2\theta_e) \end{bmatrix}\begin{bmatrix} i^s_d \\ i^s_q \end{bmatrix} - \omega_e \psi_m\begin{bmatrix} -\sin(\theta_e) \\ \cos(\theta_e) \end{bmatrix}\right)$$

$$L_\Sigma = \frac{L_d + L_q}{2} L_\Delta = \frac{L_d L_q}{2}$$

Referring to FIG. 3, the sensorless motor stationary axis voltage model 203 receives the stationary axis voltage command vector 100, the sensorless electric angle 105, and the sensorless electric angular velocity 107 as inputs, and outputs the model-based sensorless current vector 103. The interior of the sensorless motor stationary axis voltage model 203 includes the ordinary differential equation 400 of the stationary axis voltage model and the integrator 401, as in the same manner as in the sensored motor stationary axis voltage model.

FIG. 4 is a block diagram illustrating a current vector-based cross product block of the method for determining a motor angle according to various exemplary embodiments of the present invention, FIG. 5 is a block diagram illustrating an angle fusion block of the method for determining a motor angle according to various exemplary embodiments of the present invention, FIG. 6 is a view exemplarily illustrating an estimator that outputs velocity information related to a fused angle of the method for determining a motor angle according to various exemplary embodiments of the present invention, and FIG. 7 is a view exemplarily illustrating a simulation result when a fault occurs at an output of a sensor at the moment of one second.

In various exemplary embodiments of the present invention, deriving a sensor weight and a sensorless weight via the above-determined cross product of the actual current vector and the model-based sensored current vector and the cross product of the actual current vector and the model-based sensorless current vector is performed.

In the deriving a sensor weight and a sensorless weight, a sensored error may be determined by squaring the cross product of the actual current vector and the model-based sensored current vector, and a sensorless error may be determined by squaring the cross product of the actual current vector and the model-based sensorless current vector. Furthermore, in the deriving a sensor weight and a sensorless weight, the sensor weight and the sensorless weight are determined by normalizing each of the sensored error and the sensorless error.

Moreover, in various exemplary embodiments of the present invention, determining a final motor angle by applying the sensor weight and the sensorless weight to each of the sensored angle and the sensorless angle is performed. In the determining a final motor angle, the final motor angle may be determined by multiplying the sensored angle by the sensor weight, by multiplying the sensorless angle by the sensorless weight, and then by summing a multiplication result of the sensored angle and the sensor weight and a multiplication result of the sensorless angle and the sensorless weight.

Referring to FIG. 4, in the current vector-based cross product block diagram 204, an error component is obtained by obtaining a cross product 402 of the stationary axis actual current vector 101 and the model-based sensored current vector 102, and squaring 403 the error component, determining an error 301 between an actual current and the sensed current vector. In the same manner, an error 302 between the actual current and the sensorless current vector is obtained by squaring 403 the cross product 402 of the stationary axis actual current vector 101 and the model-based sensorless current vector 103. The error 301 between the actual current and the sensed current vector, and the error 302 between the actual current and the sensorless current vector are expressed by the following equation.

$$|i_{dq}^s \times i_{dq}^{sen}|^2 = (i_d^s i_q^{sen} - i_q^s i_d^{sen})^2, |i_{dq}^s \times i_{dq}^{sl}|^2 = (i_d^s i_q^{sl} - i_q^s i_d^{sl})^2$$

Referring to FIG. 5, the weight-based sensor fusion block 205 includes a normalization block 404 and an angle fusion block 405. The normalization block 404 determines a weight by use of the error 301 between the actual current and the sensed current vector and the error 302 between the actual current and the sensorless current vector. The angle fusion block 405 fuses the sensed angle 104 and the sensorless angle 105 by use of the determined weight. The sensor weight ($\rho_{sen}$), the sensorless weight ($\rho_{sl}$), and the resulting determined fused angle 108 are expressed by the following equation.

$$\rho_{sl} = \frac{|i_{dq}^s \times i_{dq}^{sen}|^2}{|i_{dq}^s \times i_{dq}^{sen}|^2 + |i_{dq}^s \times i_{dq}^{sl}|^2}, \quad \rho_{sen} = \frac{|i_{dq}^s \times i_{dq}^{sl}|^2}{|i_{dq}^s \times i_{dq}^{sen}|^2 + |i_{dq}^s \times i_{dq}^{sl}|^2},$$

$$\theta_e^F = \rho_{sl}\theta_e^{sl} + \rho_{sen}\theta_e^{sen}$$

Referring to FIG. 6, the estimator 500 includes a speed tracker 501 and an integrator 401. The estimator 500 outputs an estimated fused angle 109 and an estimated fused angular velocity 110.

The simulation result of FIG. 7 illustrates when a fault occurs at the output of the sensor (resolver) at the moment of one second. When one side of the output coil of the Sin and Cos is shorted is illustrated. First, in the sensor fusion method of the present invention, weights that are to be allocated to each of the sensed angle and the sensorless angle are determined. Before the fault, the difference of angle between the two sensors is imperceptible, so that the weight of 0.5 is allocated separately. After the fault, the weight transient state passes for approximately 0.12 seconds. After the transient state, the weight of zero is allocated to the sensed angle which is broken, and the weight of one is allocated to the sensorless angle. Accordingly, the vector control of the motor is performed with continuously fused angle information, and it also provides robust angle information even in the fault situation.

Velocity detecting with stability is also important for a motor due to the characteristics of velocity control. However, after the fault, there is a problem in the sensed angle information that a heavy error in the velocity information has occurred. On the other hand, the velocity information determined by the angle fusion method of the present invention does not produce much error.

The motor angle determination method of the present invention relates to an angle sensor fusion method of a high power motor which is used in an Urban Air Mobility (UAM). The method of the present invention enables an efficient transition to accurate angle information even in the fault situation, and enables to perform a failover function which is an alternative operation when the fault occurs in any one or more sensors.

In an exemplary embodiment of the present invention, the embodiments of FIGS. 1-6 may be performed by a controller.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same velocity. Furthermore, the term of "selectively connectable" signifies "selectively connectable members rotate separately when the selectively connectable members are not engaged to each other, rotate at a same velocity when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for determining a motor angle of a motor, the method comprising:
   detecting, by a sensor, a sensored angle and a sensored angular velocity of the motor;
   determining, by a controller, a model-based sensored current vector via a sensored voltage model based on the sensored angle and the sensored angular velocity of the motor;
   determining, by the controller, a model-based sensorless current vector via a sensorless voltage model;
   determining, by the controller, a sensor weight and a sensorless weight via a cross product of an actual current vector and the model-based sensored current vector and a cross product of the actual current vector and the model-based sensorless current vector;
   determining, by the controller, a final motor angle by applying the sensor weight and the sensorless weight to each of the sensored angle and a sensorless angle; and
   outputting, by the controller, the final motor angle and controlling the motor based on the output final motor angle.

2. The method of claim 1, wherein the sensored voltage model receives a stationary axis voltage command vector of the motor, the sensored angle, and a sensored angular velocity as inputs of the sensored voltage model, and outputs the model-based sensored current vector.

3. The method of claim 1, wherein the sensorless voltage model receives a stationary axis voltage command vector of the motor, an estimated sensorless angle, and an estimated sensorless angular velocity as inputs of the sensorless voltage model, and outputs the model-based sensorless current vector.

4. The method of claim 1, wherein each of the sensored voltage model and the sensorless voltage model includes an ordinary differential equation and an integrator.

5. The method of claim 1, wherein in the determining the sensor weight and the sensorless weight, a sensored error is determined by squaring the cross product of the actual current vector and the model-based sensored current vector, and a sensorless error is determined by squaring the cross product of the actual current vector and the model-based sensorless current vector.

6. The method of claim 5, wherein in the determining the sensor weight and the sensorless weight, the sensor weight and the sensorless weight are determined by normalizing each of the sensored error and the sensorless error.

7. The method of claim 1, wherein in the determining the final motor angle, the final motor angle is determined by multiplying the sensored angle by the sensor weight, by multiplying the sensorless angle by the sensorless weight, and then by summing a multiplication result of the sensored angle and the sensor weight and a multiplication result of the sensorless angle and the sensorless weight.

8. The method of claim 1, wherein the actual current vector is determined by applying a stationary axis voltage command vector to an actual motor and passing a current detected at the actual motor through a coordinate converter.

9. The method of claim 1, further including:
   performing a failover function of an air mobility by use of the final motor angle in controlling the motor.